Jan. 6, 1931. O. J. WATTS Re. 17,921
MERRY-GO-ROUND
Original Filed Jan. 25, 1928 2 Sheets-Sheet 1
Fig. 1.
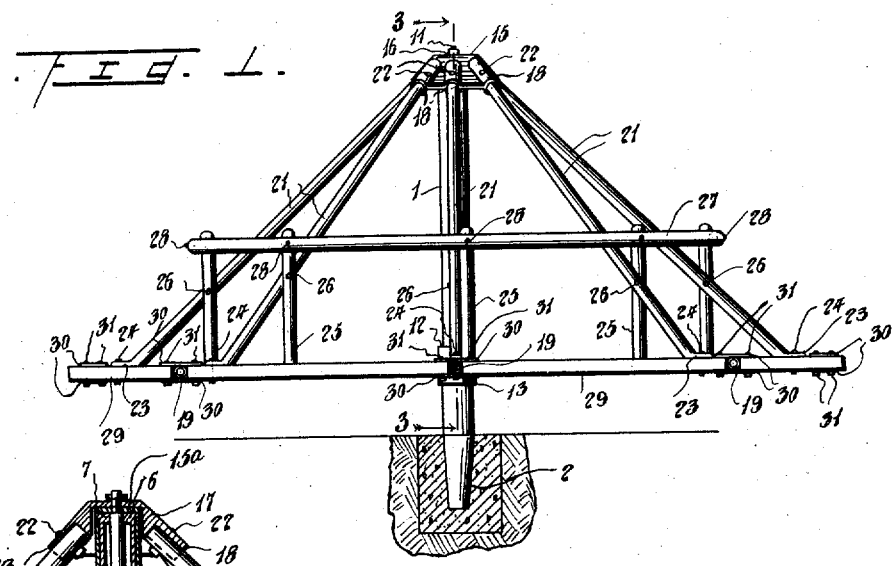
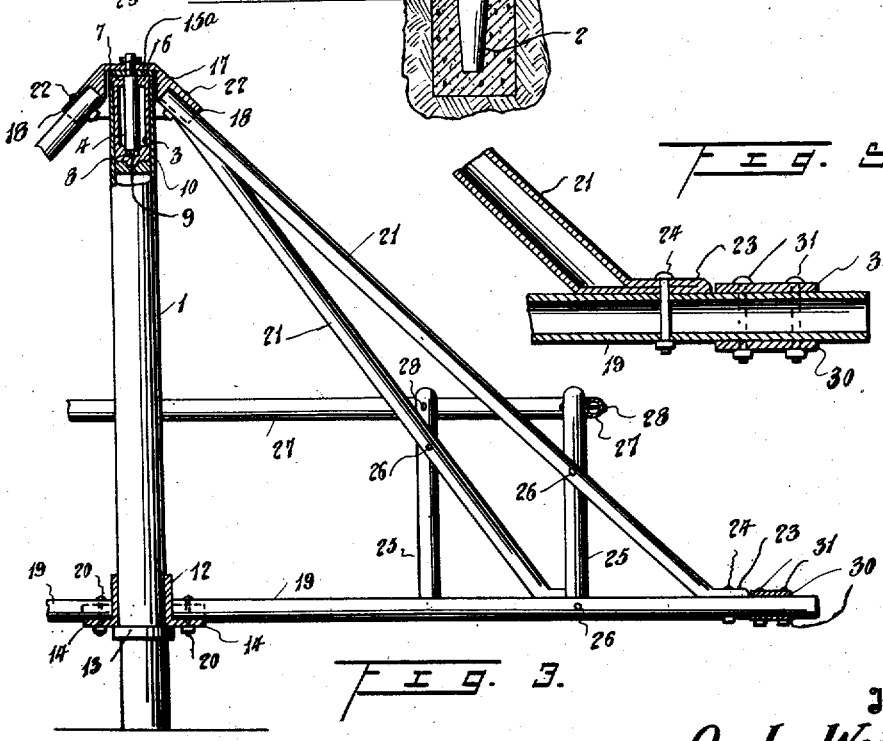
Fig. 5.
Fig. 3.
Inventor
O. J. Watts.
By L. F. Rhodes Jr.
Attorney Jan. 6, 1931. O. J. WATTS Re. 17,921

MERRY-GO-ROUND

Original Filed Jan. 25, 1928 2 Sheets-Sheet 2

Inventor

O. J. Watts.

By L. F. Randolph Jr.

Attorney

Reissued Jan. 6, 1931

Re. 17,921

UNITED STATES PATENT OFFICE

OSCAR J. WATTS, OF KENSINGTON, KANSAS

MERRY-GO-ROUND

Original No. 1,755,940, dated April 22, 1930, Serial No. 249,392, filed January 25, 1928. Application for reissue filed September 25, 1930. Serial No. 484,446.

This invention relates to a merry-go-round especially adapted for use at playgrounds, school yards and the like, and has for one of its objects to provide a device of this character which shall be adapted to seat a comparatively large number of children, which shall be adapted to be operated by the children seated thereon and which shall be adapted to be operated without danger to the children seated thereon and to those standing within the vicinity of the same.

A further object of the invention is to provide a merry-go-round of the character stated which shall be simple and practically indestructible and which shall be adapted to be manufactured and sold at a comparatively low cost.

A still further object of the invention is to provide a merry-go-round which shall embody a center post, endless seats surrounding the post, a seat supporting frame, and means for supporting the frame on the post for rotation upon the same with the least possible friction.

A still further object of the invention is the provision of a bearing for the upper portion of the rotatable member that is leak-proof to hold a lubricant, and providing a cover plate for the boxing carried by a spindle, rotatable in the boxing, said plate having means to secure the upper portion of the rotatable member thereto.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a view in side elevation of the merry-go-round.

Figure 3 is a sectional view taken on the vertical plane indicated by the line 3—3 of Figure 1.

Figure 5 is a similar view taken on a vertical plane indicated by the line 5—5 of Figure 2.

Figure 2:
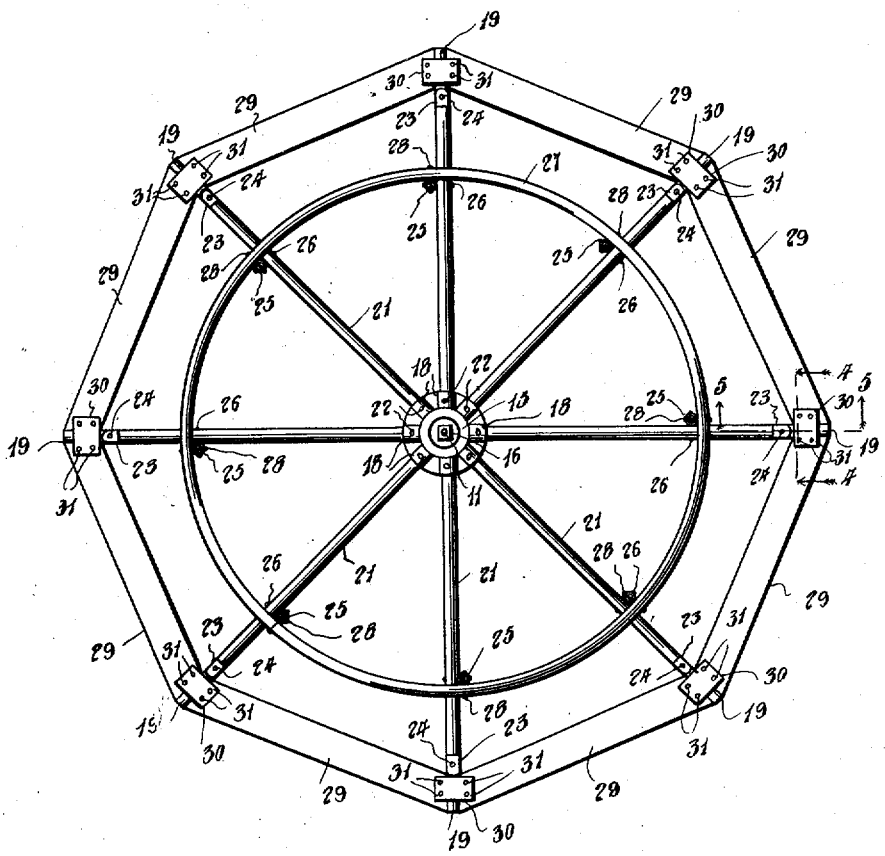
Figure 2 is a top plan view of the merry-go-round.
Figure 4:
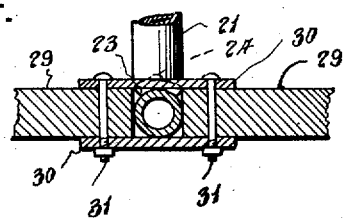
Figure 4 is a sectional view taken on the vertical plane indicated by the line 4—4 of Figure 2.

The merry-go-round comprises a center post 1 which is hollow and cylindrical and has its lower end portion fixed in a concrete base 2 embedded in the ground. A hollow bearing boxing 3 for a vertical spindle 4 is supported within the upper end portion of the post 1 by an annular flange 5, which extends outwardly from the upper end of the boxing and rests upon the upper end of the post. The upper end wall 6 of the boxing 3 is provided at its axial center with an opening 7 for the reception of the spindle 4. The spindle 4 rests at its lower end upon anti-friction bearing members 8 which are mounted in a recess 9 formed in the upper side of the lower end wall 10 of the boxing 3. The boxing 3 is larger diametrically than the spindle 4 to adapt it to contain a lubricant for the spindle and anti-friction bearing members 8. The spindle 4 extends above the boxing 3, and its upper end portion 11 is reduced and screw-threaded.

A collar 12 is rotatably supported on the post 1 by an annular shoulder 13. The collar 12 is located at or near the horizontal center of the post 1, and the shoulder 13 may be formed integrally with or made separately and secured to the post. The collar 12 is provided with radially extending coupling members 14 of substantially semi-cylindrical formation. A cap plate 15 rests upon the spindle 4, and it is secured to the spindle by a nut 16. Intermediate of the cap plate 15 and the top wall 6 of the hollow boxing 3 is a plate 15[a], forming a wear plate for cap plate 15, said plate 15[a] being also secured to the reduced portion 11 by the nut 16. Plates 15 and 15[a] in addition to providing a bearing for the rotatable member, hereinafter described, also provides an effectual cover for the opening 7 in the top wall 6 to prevent impairment of the lubricant in the boxing from rain water or other causes. Cap plate 15 is provided in its lower side with a recess 17 which is larger diametrically than and receives the upper end portion of the post 1. The cap plate 15 is provided with downwardly and outwardly extending coupling members 18 of semi-cylindrical formation.

Arms 19 extend radially from the sleeve 12 and they are secured to the coupling members 14 by bolts 20. Braces 21 extend from the coupling members 18 to the upper sides of the arms 19. The braces 21 are secured at their upper ends to the coupling members 18 by bolts 22. The lower ends of the braces 21 are horizontally disposed as shown at 23 and are secured to the arms 19 by bolts 24. Vertical bars or standards 25 connect and are secured to the arms 19 and to the braces 21 by bolts 26. A standard 25 is provided for each pair of the arms 19 and braces 21. The standards 25 reinforce the arms 19 and braces 21 and they extend above the braces to adapt them to support a hand bar and back rest 27. The hand bar and back rest 27 is of annular formation, and it is secured to the outer sides of the standards 25 by bolts 28. The standards 25 also reinforce the connections between the arms 19 and braces 21.

The arms 19 extend outwardly beyond the lower ends of the braces 21, and secured to and between the outer ends thereof are boards 29 which constitute the seats of the device. The seat boards 29 are secured to the arms 19 by plates 30 which are secured to the upper and lower sides of the seat boards by bolts 31 and which contact with the upper and lower sides of the arms.

In practice, the children occupying the seats 29 may rest against and hold on to the bar 27 and operate the device with their feet. As the seat 29 is continuous and surrounds the post 1, there is no danger of the children on the seats or those standing near the device being injured. All parts of the device, with the exception of the base 2 and the seats 29, are made from metal. The arms 19, braces 21, standards 25 and hand bar and back rest 27 are hollow, and these parts may be secured together and the arms and braces may be secured to the coupling members 14 and 18 by rivets instead of bolts or by any other suitable means. The plates 30 may also be secured in place by rivets or any other suitable means. The device requires little or no attention to maintain it in a high state of efficiency, the lubricant in the boxing 3 will last for several years, and any wear in the spindle 4, bearing members 8 and boxing walls 6 and 10 may be compensated for by adjusting the nut 16.

From the foregoing description taken in connection with the accompanying drawings, the advantages of the construction will be readily apparent to those skilled in the art to which the invention appertains. While I have described a device which I now consider to be the best embodiment of the invention, I desire to have it understood that the device shown is merely illustrative, and that such changes may be made when desired as are within the scope of the invention as claimed.

What is claimed is:—

1. A merry-go-round comprising a post, a sleeve and a cap rotatably mounted on the post, arms secured to and extending outwardly from the sleeve, braces connecting the cap and the arms, standards connecting the arms and braces, seat boards secured to the arms, and an annular member secured to the standards.

2. In a merry-go-round, a post, a hollow boxing carried by the post and provided in its bottom wall with a recess and in its top wall with an opening, anti-friction bearings mounted in the recess, a spindle resting upon the bearings and passing upwardly through the opening, a cap secured to the spindle, and coupling members on the cap for securing braces thereto.

3. In a merry-go-round, a tubular post, a hollow boxing recessed into the upper end portion of the post having a bottom wall providing a closure for said post, said boxing provided with a flange resting upon the upper end of the post, a spindle journaled in the boxing and supported by said bottom wall, a cap secured to the spindle, and coupling members on the cap for securing braces thereto.

4. In a merry-go-round, a post, a hollow boxing carried by the post and provided in its bottom with a recess and in its top wall with an opening, said boxing being leak-proof and adapted to hold a lubricant, anti-friction bearing members mounted in said recess, a spindle resting upon said bearing members and extending through said opening, a cap secured to the spindle, coupling members on the cap for securing braces thereto, and a bearing plate secured to said spindle and arranged between the cap and boxing, said plate providing a closure for said opening to prevent impairment of the lubricant.

In testimony whereof I affix my signature.

OSCAR J. WATTS.